May 2, 1939.  W. A. HART  2,156,941
ROTARY BROACHING MACHINE
Filed Jan. 13, 1936   2 Sheets-Sheet 1
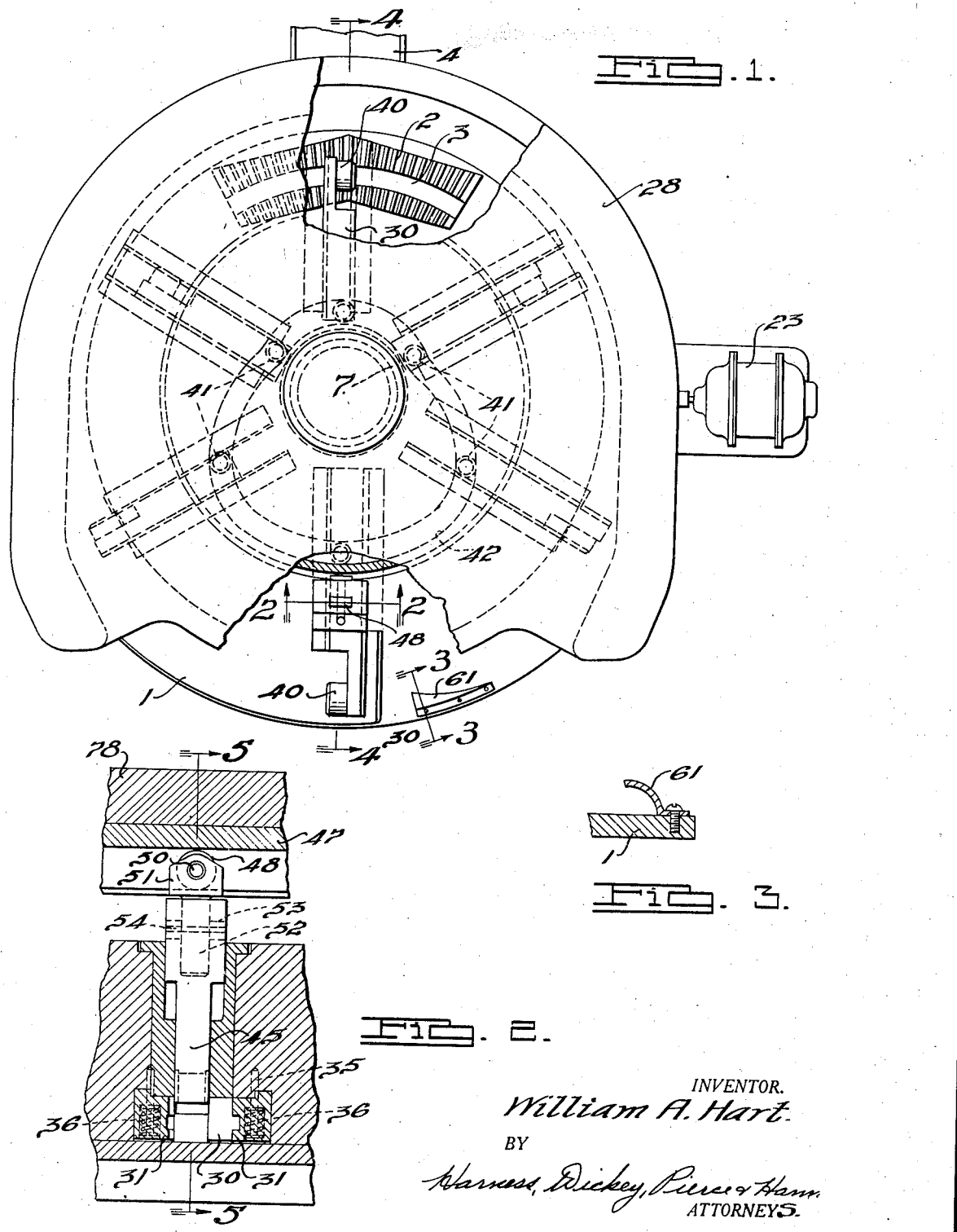
INVENTOR.
William A. Hart.
BY
Harness, Dickey, Pierce & Ham.
ATTORNEYS.

May 2, 1939.  W. A. HART  2,156,941
ROTARY BROACHING MACHINE
Filed Jan. 13, 1936   2 Sheets-Sheet 2

INVENTOR.
William A. Hart.
BY
Harness, Dickey, Pierce & Hann.
ATTORNEYS.

Patented May 2, 1939

2,156,941

UNITED STATES PATENT OFFICE 2,156,941

ROTARY BROACHING MACHINE

William A. Hart, Detroit, Mich., assignor to Colonial Broach Company, a corporation of Michigan Application January 13, 1936, Serial No. 58,852

3 Claims. (Cl. 90—33)

This application relates generally to broaching machines. More particularly it relates to a broaching machine which is adapted to mount and grip an article to be broached, automatically pass this article over a stationary broach and, subsequently, release the finished article.

While it will be apparent from the following specification that the specific embodiment of the invention herein illustrated and described is primarily designed for broaching bearing segments to exact size and shape, the generic inventive concept will find utility in many and various broaching operations. The particular type of bearing segments which the machine of the present invention is adapted to broach are generally finished to rough semi-cylindrical form and it is then necessary to broach the ends of the segments until an accurate semi-cylindrical bearing segment is obtained. It will be apparent that such a broaching operation must be very carefully regulated, in order that the finished surface will lie in a true diametral plane. Consequently, the present invention contemplates the provision of a machine which may be adjusted very accurately.

It is a general object of the present invention to provide a machine for broaching bearing segments of the type described above, which will perform on the segments a broaching operation relatively efficiently and rapidly and which is easily adjustable in order to cut away a predetermined amount of metal.

Yet another object of the present invention consists in the provision of means for mounting a segment to be broached in order that the segment will be maintained in true semi-cylindrical form throughout the broaching operation.

The present invention contemplates the provision of a rotatable work carrying head having an annular series of radially disposed jaws. The lower jaw of each pair has a boss over which a bearing segment is to be broached may be fitted. The outer configuration of this boss is identically the same as the desired inner configuration of the finished bearing segment. The upper jaw of each pair has a configuration substantially the same as the outer surface of the bearing segment to be finished, and means are provided responsive to the rotational movement of the work carrying head on which these jaws are mounted for opening and closing the jaws at predetermined intervals.

In order to facilitate the mounting of bearing segments on the boss of the lower jaw, means are provided such that as the work carrying head rotates with the jaws in open position, the lower jaw will be moved radially outwardly in order to make it easily accessible for the mounting of a bearing segment to be finished.

Another feature of the present invention consists in means operating in cooperation with the rotation of the work carrying head for automatically removing finished bearing segments from the jaws in which they are clamped during the broaching operation.

Another object of the present invention consists in the provision of a cam trackway for not only opening and closing the jaw elements with respect to each other, but also for accurately positioning the jaw members and, consequently, the elements being broached, with respect to a stationary broach over which this element passes as the work carrying head rotates.

Still further, the present invention contemplates the provision of an eccentric cam trackway which serves to control radial movement of the lower jaw member in order to move this member radially outwardly to facilitate the mounting of a bearing segment and, subsequently, to move this jaw member radially inwardly to a position directly underneath the upper jaw member. Means are provided after completion of the inward movement of the lower jaw member for producing a downward or axial movement of the upper jaw member in order that the bearing segment to be finished may be tightly clamped between the two jaws.

Still another feature of the present invention consists in the provision of a novel form of cam trackway which serves accurately to position the jaw members throughout the rotational movement of the work carrying head.

Yet another object of the present invention consists in the provision of a rotary work carrying head having a plurality of radially disposed jaw members which are adapted to continually pass over a stationary broach on a work table beneath the head. It will, consequently, be seen that the broaching of a number of bearing segments may be performed substantially continuously. As has been pointed out above, the present invention contemplates the provision of automatic means for unloading the finished articles after they have passed over the broach, and, consequently, it will be apparent that due to the utilization of a plurality of jaw members for supporting the articles being broached, the only manual labor necessary in the broaching of these bearing segments consists in the continued mounting of bearing segments to be broached on one of the jaw members during a point in its rotational movement.

Many other and further objects and advantages of the present invention will become apparent from the following specification when taken in connection with the accompanying drawings forming a part thereof.

In the drawings:

Figure 1 is a top plan view of the improved broaching machine with portions broken away in order to show the broach and also the mounting of the jaws with respect to the work table;

Fig. 2 is an enlarged sectional view taken on the line 2—2 of Fig. 1, showing the mounting of one pair of jaws in the work carrying head;

Fig. 3 is an enlarged sectional view taken on the line 3—3 of Fig. 1, showing the unloading cam and its mounting on the work table;

Figure 4:
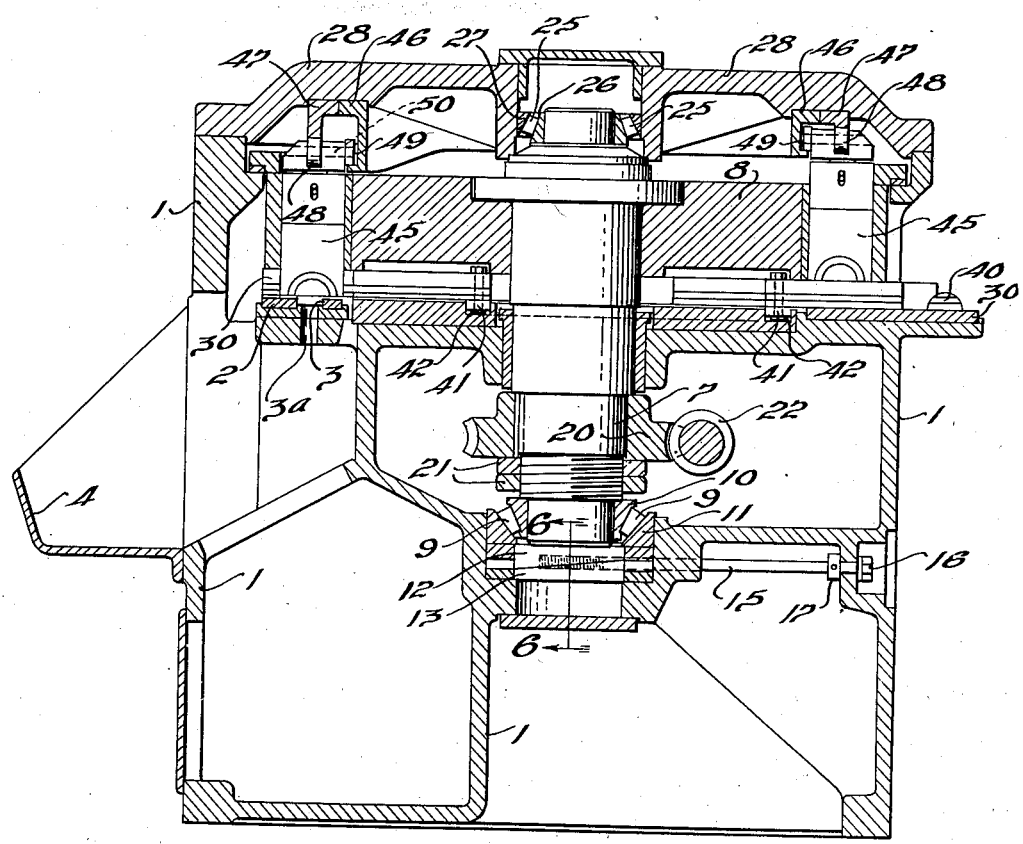
Fig. 4 is a vertical sectional view taken on the line 4—4 of Fig. 1, showing in detail the mounting of the rotatable work carrying head.

With more particular reference to the drawings, the specific embodiment of the invention disclosed therein comprises a base 1. This base is preferably formed from a suitable casting and has a substantially circular work table preferably formed integrally in the central portion thereof supported by a substantially cylindrical wall structure, which extends upwardly above the work table, the purpose and function of which will hereinafter become clear.

Adjacent the periphery of this work table on the upper surface thereof is a broach 2 preferably removably mounted thereon. This broach 2 has a series of teeth lying substantially in the radii of the circular work table and has inner and outer arcuate sections with an arcuate channel 3 formed therebetween. An arcuate slot 3a is provided through the work table which registers with this channel. It will be clear that this arcuate channel between the two arcuate broaching elements 2 provides an outlet for chips and shavings from the broach which may drop downwardly through the slot 3a into the chip trough 4 which is secured to the casing 1.

Mounted substantially centrally with respect to the circular work table is a shaft 7 which serves to support a substantially circular work carrying head 8. This shaft 7 is supported at its lower end by means of a suitable series of conical roller bearings 9 mounted between conical raceways 10 and 11. The raceway 10, it will be seen, is secured directly to the shaft 7 while the lower raceway 11 is supported in the casing 1 by means of a pair of interfitting rings 12 and 13 having adjacent helical faces. Preferably these helical faces extend throughout about 180 degrees around the axial end surfaces of these two rings. The lower ring 13 is preferably rigidly secured to the casing 1 and the upper ring is adapted for rotation thereon in order to vary the vertical position of the raceway 11 and consequently adjust the vertical position of the shaft 7.

In order to regulate the angular position of the ring 12 with respect to the stationary ring 13, a series of worm teeth 14 are provided in the peripheral surface of the ring 12. These worm teeth 14 cooperate with a series of worm teeth on an adjusting shaft 15 which is journaled in suitable bearings in the casing 1. This adjusting shaft 15 has at its outer end a nut 16 accessible from the outside of the casing and is provided with a screw collar 17 to lock it in predetermined longitudinal position. It will be appreciated that rotation of the shaft 15 by means of the nut 16, which is exteriorly accessible, will provide a very accurate and convenient means for locating the vertical position of the shaft 7 and the work carrying head 8 thereon. The shaft 7 has a worm wheel 20 firmly secured thereto by means of a pair of lock nuts 21. This worm wheel 20 is driven by means of a suitable worm 22 which is in turn driven by means of an electric motor 23. Suitable gear reducing mechanism (not shown) is preferably interposed between the motor 23 and the worm 22 in order to substantially reduce the speed at which the vertically disposed shaft 7 is driven.

The upper end of the shaft 7 is journaled in a suitable set of roller bearings 25 carried in a pair of conical raceways 26 and 27. The raceway 26 is preferably secured directly to the upper end of the shaft 7, and the raceway 27 is preferably mounted in a top casting 28 which is adapted to be permanently secured to the upper edge of the walls of the casing 1.

The casing 1 is preferably open at its front side, as viewed in Fig. 1, in order to provide a suitable space for feeding work into the machine. A plurality of radially disposed jaw members 30 are disposed at suitable intervals around the work carrying head 8. This work carrying head 8 is preferably provided with a plurality of radially disposed slots in its lower face, adapted to receive these jaws. The jaws 30 are each mounted for radial movement in a pair of trackway elements 31 on each side of each of the jaw members 30. These trackway elements 31 have channels in their adjacent faces adapted to receive complemental tongues on the lateral sides of the radially movable jaw members 30. These trackway elements are secured in position in the radial slots in the work carrying head by means of cap screws 35 passing through suitable apertures in the trackway elements. The mounting of these trackway elements is preferably resilient and spring means are preferably interposed between the trackway elements and the heads of studs 35. As is seen in Fig. 2, these spring means constitute a plurality of compression springs 36 surrounding the cap screws 35 and located in suitable apertures in the trackway elements 31.

It will be appreciated that this construction provides for a substantially rigid but yet slightly resilient movement of the trackway elements. It will be seen that the jaw member 30 is slidable radially inwardly and outwardly with respect to the work carrying head in which the trackway elements are mounted. The jaw elements 30 are each provided at their outer ends with bosses 40 having a configuration substantially the same as the internal curvature of the bearing segments to be broached. The inner ends of each of the jaw members 30 are provided with downwardly extending rollers 41 journaled on suitable studs secured to the jaw elements, and it will be seen that these rollers 41 are adapted to be received in a channel 42. The channel 42 provides a cam trackway in which the rollers 41 run in order to accurately radially position each of the jaw members 30 during the rotational movement of the work carrying head about its axis. It will be seen that the cam trackway 42 lies on the arc of a circle concentric with the axis of rotation of the shaft 7 during the movement across the broaching element 2. It will further be seen that this cam trackway causes a movement of the jaw member 30 outwardly, radially, from the axis of rotation until a maximum outward movement is obtained on the front side of the machine where the elements to be broached are mounted on the boss 40.

A plurality of upper jaw members 45 are adapted for axial movement with respect to the work carrying head 8 and operate in suitable axially disposed apertures therein. These jaw members 45 are each adapted to cooperate with the jaw members 30 to lock the bearing segment to be broached in firm position therebetween while this segment moves over the broaching element 2. A suitable pair of cam trackways 46 and 47 serve to control the vertical position of the upper jaw member 45 as the work carrying head is rotated. These cam trackways 46 and 47 preferably lie in a circular path concentric to the axis of rotation of the shaft 7 and are preferably firmly secured to the fixed cover 28 of the casing 1. The inner of these two cam trackways is of substantially channel cross section and on the inside of the lower of the channel legs provides a trackway for a roller 48. The trackway 46 is preferably also concentrically mounted with respect to the axis of rotation of the shaft 7 and is of substantially L-shaped cross section and provides a trackway for a roller 49. Both the rollers 48 and 49 are preferably journaled for rotation on a common shaft 50 which is in turn carried in a jaw supporting head 51. A suitable lost motion connection is provided between the jaw supporting head 51 and the jaw member 45. This lost motion connection preferably comprises a stud 52 having a transverse slot 53 therein. This stud 52 is preferably formed integrally with the jaw supporting head 51. This stud extends downwardly into a suitable aperture in the upper end of the jaw 45 and a pin 54 passes through the jaw 45 and through the slot 53 to lock the jaw to the jaw supporting head. A pair of compression coil springs 55 are preferably retained in suitable bores in the jaw 45 and are confined between the base of these bores and the jaw supporting head 51, consequently normally urging the jaw 45 into a position away from the jaw supporting head 51.

The cam trackways 46 and 47 are preferably of a configuration such that as the work carrying head 8 is rotated, the rollers 48 and 49 engaging these trackways will accurately position the jaw 45 with respect to the work. These cam trackways are so formed that the jaw 45 will be moved downwardly into engagement with the work just prior to the movement of the work across the broach 2 and preferably will be raised from the work as soon as the broaching operation has been completed.

Figures 5, 6, 7:
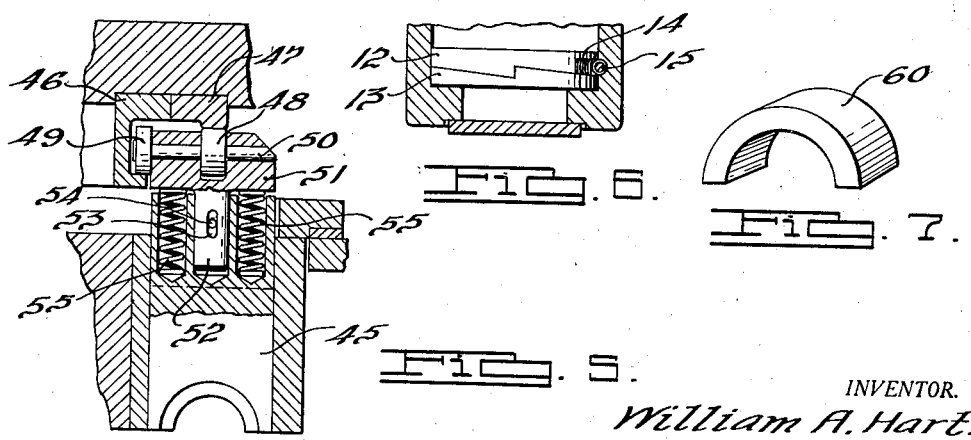
Fig. 5 is a vertical sectional view taken on the line 5—5 of Fig. 2, illustrating the mounting of the upper jaw in its cam trackway.
Fig. 6 is a vertical sectional view taken on the line 6—6 of Fig. 4, showing in detail the means for adjusting the vertical position of the work table.
Fig. 7 is a perspective view of a bearing segment of the type adapted to be broached in the machine of the present invention.

From the foregoing it will be apparent that the machine as a whole may be run substantially continuously. A bearing segment 60 such as is shown in perspective in Fig. 7 may be placed upon the boss 40 of the lower jaw element 30 at the front side of the casing as viewed in Fig. 1. As the work carrying head 8 is continuously rotated, it will be seen that the lower jaw 30 will be drawn radially inwardly until the bearing segment mounted thereon lies directly beneath the axially or downwardly movable upper jaw 45. At this point the cam trackways 47 and 46 will serve to move this axially movable jaw 45 downward into engagement with the upper side of the bearing segment to be broached. This engagement, it will be seen, serves to grip the bearing segment on both sides thereof and accurately retains the bearing segment in position during the broaching operation. It will readily be appreciated that, due to the lost motion connection existing between the jaw carrying head 51 and the jaw 45, this grip will be to some extent resilient, but yet will be firm and accurate and provide means for accurately positioning the segment to be broached with respect to the work carrying head. Likewise, it will be seen that due to the resilient mounting of the trackway elements 31 in the work carrying head, the position of the lower jaw 30 will be somewhat resilient, but nevertheless its respective position with relation to the broaching element will always be accurately maintained. Thus, as the bearing segment is moved across the broach, the surfaces thereof will be accurately finished to the desired size. After the segment has passed over the broach it will be clear that the cam trackways 46 and 47 will serve to raise the axially movable jaw 45 from the bearing segment prior to the time the lower jaw member 30 starts its radially outward movement. It will be apparent that this radially outward movement of the lower jaw member 30 is substantially completed at an angularity somewhat prior to the actual position in which the bearing segment was mounted. It will be seen that as rotation takes place, the boss 40 of the lower jaw element 30 will pass adjacent and underneath an unloading cam 61 which will serve to remove the finished bearing segment from the boss 40. At this point a new bearing segment to be broached may be placed on the boss 40 and the operation repeated.

It will be appreciated that in the machine disclosed herein, a plurality of these cooperating jaw members are spaced radially about the work carrying head and consequently the machine as a whole may be substantially continuously run. It will further be apparent that due to the mounting of the centrally disposed shaft 7 very accurate positioning of the jaw members with respect to the broaching elements may be obtained, and any desired degree of broaching may be obtained by this accurate adjustment of the vertical position of the centrally disposed shaft 7.

It will be seen that after the broaching operation has been completed the unloading cam 61 serves to raise the finished bearing segments off the boss 40 on which they were mounted and a new bearing segment may be immediately placed thereon without interrupting the operation of the machine.

It will be understood that the specific embodiment of the invention herein illustrated and described is merely illustrative of one form which the generic inventive concept presented in this application may take. Many other and further modifications falling within the scope of the subjoined claims will be apparent to those skilled in the art.

What I claim is:

1. A broaching machine comprising a stationary base frame work, a broach rigidly mounted on said frame work, a vertically disposed shaft disposed substantially centrally of said frame work, a work carrying head secured to said shaft, radial slots disposed in said head, means in said slot adapted to engage an element to be operated upon and position the same with respect to said broach, and means for varying the vertical position of said shaft and work table to control the position of said work with respect to said broach.

2. A rotary broaching machine comprising a base frame having a stationary broach mounted thereon, a rotary work carrying head journaled in said frame, work clamping jaws carried by said head adapted to retain work in position with respect to said broach, a cam trackway disposed above said head and rigidly mounted with respect to said frame, said cam trackway serving to urge the work being operated upon downwardly into engagement with said broach.

3. In a broaching machine, a rotatable work carrying head, a stationary broach, work receiving elements carried by said head and disposed above said broach, means for radially moving said elements from loading to cutting positions, reciprocating means for the work on said work receiving elements, means for reciprocating said last named means to thereby clamp said work on said work receiving elements and positively force the work into engagement with said broach, said moving means and clamping means being actuated in sequence by rotation of said work carrying head.

WILLIAM A. HART.